United States Patent
Josephson et al.

(10) Patent No.: US 6,771,293 B1
(45) Date of Patent: Aug. 3, 2004

(54) SYSTEM FOR MULTI-CRITERIAL DECISION MAKING

(75) Inventors: John R. Josephson, Columbus, OH (US); Balakrishnan Chandrasekaran, Columbus, OH (US); Mark Carroll, Columbus, OH (US)

(73) Assignee: The Ohio State University Research Foundation, Columbus, OH (US)

( * ) Notice: Subject to any disclaimer, the term of this patent is extended or adjusted under 35 U.S.C. 154(b) by 0 days.

(21) Appl. No.: 09/360,828

(22) Filed: Jul. 23, 1999

Related U.S. Application Data (60) Provisional application No. 60/093,998, filed on Jul. 24, 1998.

(51) Int. Cl.[7] .................................................. G09G 5/00
(52) U.S. Cl. ............................. 345/804; 707/3; 345/771
(58) Field of Search ............................... 345/971, 619, 345/621, 804, 805, 837, 771; 382/226; 434/236; 707/100, 104.1, 3

(56) References Cited

U.S. PATENT DOCUMENTS

| | | | | |
|---|---|---|---|---|
| 5,159,647 A | * | 10/1992 | Burt | 382/226 |
| 5,373,456 A | * | 12/1994 | Ferkinhoff et al. | 382/226 |
| 5,581,634 A | * | 12/1996 | Heide | 382/226 |
| 5,732,200 A | * | 3/1998 | Becker et al. | 395/971 |
| 5,841,437 A | * | 11/1998 | Fishkin et al. | 345/619 |
| 6,222,535 B1 | * | 4/2001 | Hurd, II | 345/971 |

OTHER PUBLICATIONS

"An Architecture for Exploring Large Design Spaces" obtained from Ohio State University Website, www.cis.ohio-state.edu, 1998.*

Publications of John R. Josephson, obtained from Ohio State University Website, www.cis.ohio-state.edu, published Jul. 3, 2000.*

Data on Fifteenth National Conference on Artificial Intelligence (AAAI–98) published on Internet at www.aaai.org (1998).*

\* cited by examiner

*Primary Examiner*—Sam Rimell
(74) *Attorney, Agent, or Firm*—Standley Law Group LLP (57) ABSTRACT

An architecture for exploring large design spaces is disclosed. The architecture consists of three main components. A Design Seeker methodically considers and evaluates a very large number of design candidates. A Filter based on a dominance criterion locates a relatively small number of promising candidates that are retained for further analysis. A Viewer allows a designer to examine tradeoff diagrams that present the filtered candidates for evaluation, analysis, and further exploration. The computational load of the Design Seeker may be distributed among a large number of workstations in a client-server computing environment.

38 Claims, 2 Drawing Sheets

SYSTEM FOR MULTI-CRITERIAL DECISION MAKING

This application claims the benefit of U.S. Provisional Patent Application No. 60/093,998, filed Jul.24, 1998.

This invention was made with Government support under Grant No. N00014-96-1-0701, awarded by USONR (DARPA). The Government has certain rights in this invention.

TECHNICAL FIELD

The present invention is in the field of automated decision-making support systems. A system and an architecture for exploring very large design spaces is disclosed.

BACKGROUND

Design may be considered to start from a specification of properties and behavior that an artifact is intended to satisfy. It typically ends when the designer is able to describe a set of components and their interconnection, and a mode of use by a designer. If an instance of the artifact is constructed with the components in the specified inter-component relationships, and if a designer interacts with it as described in the mode of use, then the artifact's properties and behavior are supposed to satisfy the given specifications.

Design may be formulated as a search in a problem space. Except in routine design tasks, the design process usually involves considering alternative configurations of components, alternative components, and various parameter values. The design candidates that arise during this process are usually evaluated using multiple criteria. Due to time and other resource limitations, designers usually consider only a narrow range of the possible combinations of components and configurations.

In prior art systems, the design problem has been formulated explicitly as a parameter optimization problem, and well-known optimization techniques may be applied. Most commonly, these techniques are variations of hill climbing. Given a design candidate, the direction of change in which the gain in a performance measure is largest is first ascertained, a new design candidate is chosen in that direction, and this process is repeated until changes in any direction result in a decrease in the performance measure. However, this optimization technique is not always applicable. When design candidates are generated by changes of components and configurations, which may be unordered, there may be no adjacency relationship to exploit in the space of design candidates. Moreover, hill climbing techniques, by requiring that a single evaluation function be defined, preclude explicit, local reasoning about tradeoffs among multiple performance criteria. In general, it is hard to use symbolic knowledge in numerical optimization schemes and thus, they are not very good for early-stage design.

SUMMARY OF THE INVENTION

The disclosed system and architecture supports exploration of very large design spaces, for example, spaces that arise when design candidates are generated by combining components systematically from component libraries. The architecture is comprised of a Design Seeker, a Filter, and a Viewer. Using the Design Seeker, a very large number of candidates (millions or more) are methodically considered and evaluated. The architecture is especially appropriate during the stage of conceptual design when high-level design decisions are tinder consideration, multiple evaluation criteria apply, and the Designer Seeker assures that good design possibilities have not been overlooked. The Filter uses a technique based on a dominance criterion to select, from millions of design candidates, a relatively small number of promising candidates for further analysis. The dominance criterion applied by the Filter is lossless in that it insures that each candidate not selected is inferior to at least one of the selected candidates. The Viewer provides an interactive interface through which the selected designs are presented to the designer for analysis of tradeoffs and further exploration. In a preferred embodiment of the present invention, the computational load is distributed among a large number of workstations in a client-server computing environment. The results of experiments using the architecture to explore designs for hybrid electric vehicles are presented.

In the present invention, a design-space exploration technique is used that explicitly considers large numbers of design candidates, sampling widely from all regions of the design space. This exploration tells the designer how the design candidates in the space behave with respect to the various evaluation criteria, and helps to identify candidates or regions with interesting properties. All regions of the design space are sampled sufficiently to develop an understanding of the characteristics of the design space. A very large number of design candidates may be considered. This initial exploration permits for a more detailed exploration of selected areas of the design space. Thus, this kind of exploration is especially appropriate for the conceptual design stage.

The need to examine a very large number of candidates requires substantial computing power. Fortunately, conceptual design is a relatively small part of the overall design process. Thus, allocation of substantial computing resources for this stage of design may be justified in view of its importance, especially as computing power is becoming more affordable. This kind of design space exploration has natural parallelism that can be exploited to distribute the computational burden. In a preferred embodiment of the present invention, a large collection of networked workstations provide the needed computing power.

The present invention includes one or more computers adapted to perform the steps of generating and evaluating design candidates, filtering design candidates to select a relatively small number of design candidates for further evaluation, and presenting selected design candidates to a designer for further consideration. The present invention also includes software conforming to the architecture of the present invention.

DETAILED DESCRIPTION OF THE INVENTION

Figure 1:
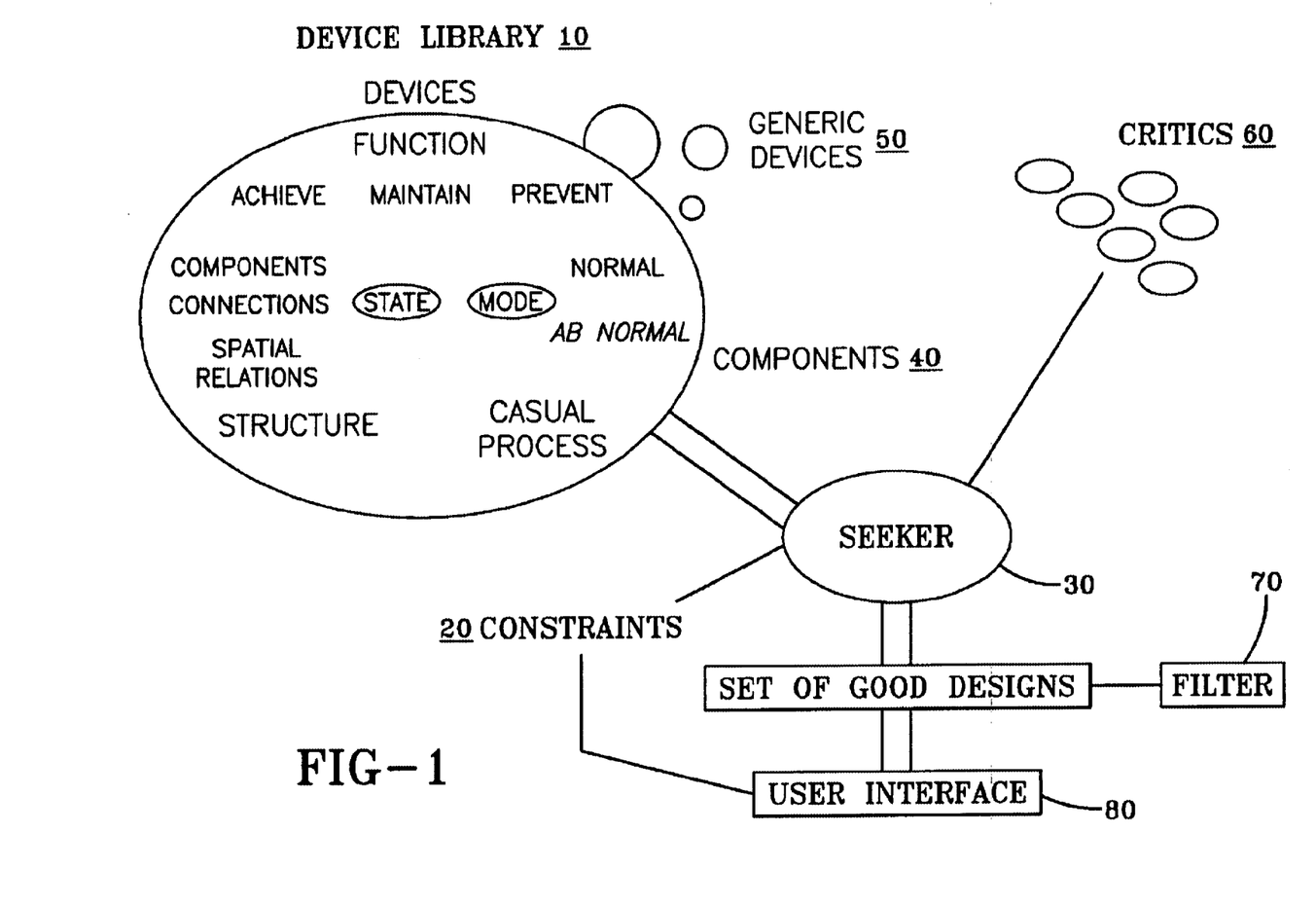
FIG. 1 is a block diagram of an architecture for a preferred embodiment of the present invention.

The overall architecture for the present invention is that of an interactive decision-support architecture for design, as shown in FIG. 1. Referring to FIG. 1, a component/configuration library or Device Library 10 is available for generating design candidates. The designer may specify constraints 20. The Design Seeker 30 generates design candidates by selecting components 40 from the Device Library 10 and composing them, according to configuration templates (generic devices 50.), to satisfy the given constraints 20. Several design critics 60 evaluate each design candidate. Each critic 60 assesses a candidate design from the point of view of a particular aspect of performance. One might focus on cost, another on convenience of use, yet a third on diagnosability, and so on. A critic 60 may use an evaluation function based on the conclusions of other critics.

The total number of design candidates might be quite large, so, for the designer to make effective use of the information from the critics, a Filter 70 is applied to select a relatively small number of designs that are worth examining further. A lossless filtering criterion (i.e., one for which there are guarantees that there is no danger of excluding good designs) is applied to the design candidates.

The designer is presented with the design candidates that survive the filtering process. Since a large number of candidates may yet remain, it is important to develop effective ways to aid the designer in investigating the properties of the surviving designs. Thus, the user interface or Viewer 80 is an important part of the architecture. Several user-interface elements are very useful. In particular, visualizing the set of surviving designs by way of interactive, connected, tradeoff diagrams enables the designer to zoom in on subsets with desirable tradeoff characteristics, and so reduce the number of designs for further investigation to a manageable few.

Design Seeker

Design candidates are generated by systematically considering the members of a set of preset configurations or "generic devices." For each generic device, alternative component substitutions from a device library are systematically considered, and for components, various parameter values are considered as chosen from a set of designer-specified landmark values.

Design candidates are checked against any constraints that might rule them out. Two sets of designer-supplied constraints may be applied: one set is applied to partially specified designs and the other is applied to fully specified designs. Partial designs are created on the way to creating fully instantiated design candidates, and arise when not all of the components in a configuration have yet been chosen, or not all the parameter values. Sometimes partial designs may be checked against constraints with little computational cost. For example, if there is a constraint on total weight, a partially specified design may be rejected as soon its weight exceeds the limit, thus avoiding the substantial amount of work involved in generating and evaluating refinements of the design. Constraints that apply to fully specified designs are used to eliminate candidates. Such constraints may be used to eliminate implausible combinations or unacceptable performance.

Prior to constraint checking, designs are sent to various design critics, and each design is annotated with the conclusions from the critics. These conclusions may be used by the constraints, and are the basis for design filtering, which selects a subset of candidates to present to the designer. Dominance filtering is an important type of design filtering, and may be applied after generating and evaluating all candidates, or incrementally, as candidates are being generated and evaluated.

Dominance Filtering

A Filter based on dominance criterion is applied to the designs to locate a relatively small number of promising candidates to be retained for further analysis. A design candidate A dominates candidate B if A is superior or equal to B with respect to every criterion of evaluation and distinctly superior with respect to at least one criterion. Dominated designs need not be considered further—they may be filtered out. Among the designs that survive the dominance-filtering process, none is clearly superior to another. These designs are retained for further analysis.

Figure 2:
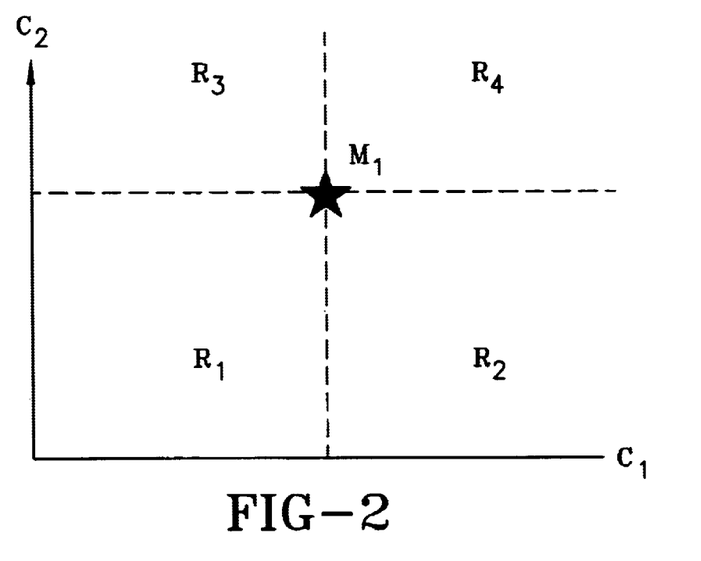
FIG. 2 is an illustration of the dominance filtering technique of the present invention.

The dominance filter may be represented geometrically. FIG. 2 illustrates the situation when there are only two evaluation criteria $C_1$ and $C_2$. Larger values of $C_1$ and $C_2$ are more desirable. Let $M_1$ be a design candidate. If another design candidate $M_2$ falls in region $R_1$, it can be eliminated, since $M_1$ would be clearly superior to $M_2$ on both criteria. If it falls in Region $R_4$, $M_1$ can be eliminated since $M_2$ would best $M_1$ on both criteria. If $M_2$ falls in Regions $R_2$ or $R_3$, both $M_1$ and $M_2$ need to be retained for the next stage since neither would be superior to the other with respect to all criteria of evaluation. This 2-dimensional description of dominance filtering generalizes to situations where there are more than two criteria; similar behavior will occur in the appropriate multidimensional space.

The dominance filter keeps a list of retained candidates, to which new candidates are compared. New candidates are compared serially to the items on the list. If the new candidate is dominated by some from the list, then there is no need to compare with the remaining elements in the list, and the new candidate is discarded, which contributes to efficiency. If the new candidate dominates a candidate in the retained list, the comparison still needs to continue with the other candidates in the list, since the new candidate may dominate some others as well. The final surviving set is independent of the order in which the candidates are generated and compared. Another probable source of efficiency is that if a design on the list beats a new one, the dominator is moved to the front of the list. This design is more likely to beat other new designs as well, in comparison with others on the list, and it is more efficient to consider it early when evaluating new candidates.

An important feature of the dominance filter is the size of the surviving set. Let f be the fraction of the total design space that survives dominance filtering. If f is small, then the task of the designer is much eased. She may consider a relatively small number of designs for further analysis while retaining assurance that the results speak about the entire design space.

In a given domain, the value of f typically increases as the number of evaluation criteria increases. The probability that a design candidate is worse than another in all N dimensions of criticism typically becomes smaller as N increases. However, f may become smaller as the size of the design space increases, for example, by considering parameter changes at finer resolutions. One can generalize from FIG. 2 and consider each design to be a point in N-dimensional space, N being the number of criteria to be considered in dominance checking. The surviving set will be on the surface of the region of space wherein the designs lie. As more points (designs) are added within or near the region of designs in the N-dimensional space, the total number of designs should increase at a faster rate than the number of designs on its surface.

Evaluation Criteria may be added and removed as follows. A set of candidates may survive following exploration and dominance filtering. If the problem specification changes and one of the criteria is no longer relevant, the new surviving set may be constructed from the previous one. If A dominates B in N dimensions of criticism, A will still dominate B in N−1 dimensions. Thus, the elements of the surviving set for N dimensions will still dominate the previously pruned candidates in N−1 dimensions as well. Dominance filtering may be applied among the members of the N-dimension surviving set to compute the N−1-dimension surviving set.

If the problem statement changes and a new criterion is added, the solution is more complex. That A dominates B in N dimensions is no guarantee that A will still dominate B in N+1 dimensions. B may be better than A in the new dimension of criticism. Therefore, the new surviving set cannot be computed from the old surviving set. Dominance filtering is applied again to consider all the elements of the design space.

Independence of Criteria

Dominance checking does not require evaluation criteria to be independent. In general, if the values according to two criteria are positively correlated, use of these criteria will not increase the size of the surviving set as much as two independent criteria might. However, if values according to two criteria are negatively correlated (as they might well be when the designer is interested in investigating performance tradeoffs), the size of the surviving set may be larger than it would be if the criteria were independent.

Accuracy of Models

When considering whether A is superior or equal to B with regard to every criterion, and superior in at least one criterion, it is important to consider that the models upon which critics are based may have limited accuracy. The dominance filter may be adapted to take into account suspected model inaccuracy. A constant e may be introduced for each critic such that A and B are considered to perform equally well with regard to the criterion of that critic if, as evaluated by the critic, the performance of the two differs by less than e. Weakening the stringency of filtering in this way reduces the chances that a good design is mistakenly filtered out because of modeling inaccuracies. On the other hand, increasing e for any critic will typically increase the surviving fraction. In choosing the value of e for a particular critic, the estimate of the accuracy of the domain model used by that critic may be expressed. Thus, choosing a value for e gives a domain expert the opportunity to express a meta-knowledge judgment about the accuracy of the computer-based model.

Distributed Computing

Suppose that the design space has a million candidates, five critics have been specified, and each critic needs one tenth of a second for evaluating a candidate (all reasonable numbers). The total time on a serial machine for performing exhaustive evaluation will be about six days. Because of time requirements of this sort, a novel computational architecture was developed that employs Modula-3 network objects to make use of the distributed computing environments that are presently commonly available in engineering institutions. A client-server architecture is employed that uses idle workstation time (often over 150 machines at a time) to allow the criticism of candidate designs to proceed in parallel.

The Exploration Interface

Even if dominance filtering is quite effective, one would expect hundreds if not thousands of designs to survive after exploring a design space consisting of, say, hundreds of thousands of design candidates. These surviving designs would be ones where none would be clearly superior to another, based on the criteria that were used. Knowledge that was not incorporated during the search is needed for choosing among designs. If the additional knowledge were available in the form of new critics that were not used, the best way to proceed would be to do the search again using the new critics. Similarly, if the designer knew in advance how to weight the different criteria to form a composite evaluation, she might have used this composite evaluation to perform some form of optimization. However, there is an important opportunity at the conceptual-design stage to develop a sense of the tradeoffs that arise from multiple criteria.

A Viewer or visualization environment presents the designer with a set of tradeoff diagrams. Each diagram is a two-dimensional scatter plot, where the axes are a pair of design criteria, and all the surviving designs are plotted in that space. For example, if there are three critics with corresponding design criteria $C_1$, $C_2$, and $C_3$, up to three plots will be generated, one each for $C_1$–$C_2$, $C_2$–$C_3$, and $C_3$–$C_1$. Each design candidate will be represented in each of these plots. The designer can select any region in any of the plots and the design candidates that fall in the selected region in one diagram space will be highlighted in the other plots. The designer can thus easily observe how design candidates that look interesting in one of the diagrams fare with respect to other tradeoffs. In general, candidates that are contiguous in one of the plots will not necessarily be contiguous in the other plots.

Typically, a designer may explore the surviving designs by identifying regions or individual candidates that appear to have interesting properties in one diagram, selecting them, and examining their properties in the other diagrams. For example, the designer may note in one diagram that a small number of designs seem to have high evaluations in both dimensions. This region may be selected. The interface then highlights in the other diagrams the candidates in the selected region in the first diagram. If their performance is satisfactory with respect to the other dimensions, that subset may be marked as worthy of further attention. A particularly important function of visual analysis is to see if there are regions in the diagrams where, for a relatively small sacrifice in performance in one dimension, a large gain is available in the other dimension. This visual analysis gives the designer some understanding of the structure of the design space, and locates opportunities for favorable design tradeoffs.

A designer may make a variety of visual analyses using the tradeoff diagrams. A designer may first note certain interesting properties in one region of one of the diagrams, think about what was noticed, and generate explanations for the interesting features. At this point, a designer may make additional hypotheses about relationships in other diagrams and regions. In addition to identifying a small number of design candidates for further analysis, a designer may gain a deeper understanding of the design space.

The number of possible tradeoff plots increases approximately with the square of the number of criteria. So, typically, a designer does not consider all plots at once. Instead, a designer may choose which plots to see. Even if she never examines the results according to a particular criterion, it has still entered into the dominance calculations. Dominance checking does not depend on the exploration environment. In many fields, the number of criteria may not need to be very large.

Exploration results may be presented to the designer in a number of ways. A designer may select a subset of designs to be considered in a special Examination Set (ExamSet) for closer inspection. A designer may also define regions of arbitrary shape; A designer may create more than one ExamSet and then union, intersect, or pull a subset from any of them. The designer may look at any available ExamSet through multiple, cross-updating tradeoff plots, and other inspectors. A designer may be provided with a set of abstraction agents (Abstractors) able to automatically form certain interesting generalizations about the designs in any chosen ExamSet. One such Abstractor gathers statistics on the design choices that are represented in the ExamnSet, and if any choice is represented by more than 50% of the designs, it produces a comment of the form:

X% of the designs in <ExamSet> are designs where <design choice>.

For example, "88% of the designs in ExamSet-1 are designs where engine=Volkswagen #2." or "All of the designs in ExamSet-2 are designs where configuration=parallel-hybrid." This information is helpful to the designer in understanding and exploring the implications of the search results.

Data may also be displayed and reviewed in higher dimensions. For example, automated clustering algorithms may be applied to identify interesting properties in the higher-dimensional spaces. Higher-dimensional spatial analysis algorithms might be applied to identify outliers. Outliers tend to have interesting properties and may point to broken domain models. Conversely, the absence of Outliers gives the designer some confidence in the fidelity of domain models and reassures the designer that no especially good design possibilities have been overlooked.

Experimental Results

The Domain. The domain in which an experiment was performed is that of hybrid electric vehicles. Hybrid electric vehicles are automobiles that use both an electrical motor and an internal-combustion (IC) engine as power sources. Electrical motors are attractive as power source partially because of the potential for using the motor as a generator during braking and thus recapturing the kinetic energy of the vehicle. They also have good emission properties, making them attractive for city use. On the other hand, they have limited range because of the limitations of current battery technology. Hybrid vehicles use an IC engine to extend range, either to move the vehicle when battery power is low, or to recharge the batteries. An interesting issue in the design of hybrid vehicles is the control policy, which is the formula that decides when to use which source of power for movement and when to activate the IC to charge the batteries.

The domain has a number of attractive features for exercising the architecture of the present invention. The underlying design space is not simply generated by parametric variations; for example, there are four distinct vehicle configurations. There are also several criteria for evaluating performance, and no simple way to combine them a priori into a weighted composite objective function. Moreover, there are well-defined mathematical models for the various design criticisms of interest. With several alternative components to be considered for each component choice point within a configuration alternative, the design space grows combinatorially and rapidly. When the consideration of alternative control-policy parameters is included, the combinatorial explosion of design alternatives is even more dramatic.

The most basic components are the four vehicle configurations, or types of vehicles: IC engine only; Electric motor only; Parallel hybrid; Serial hybrid. Once a commitment has been made to a particular configuration, there is a further need to specify the set of components required by that configuration, and parameter values associated with the various components. This set is different for each of the four types, although some of the components are common to each type. First, the components and parameters common to all of the vehicle types are described.

Transmission, of which the available types are: Automatic, Manual or CVT (continuously variable). For manual transmissions, there is a choice of the number of gears (3, 4, or 5-speed) and the corresponding gear ratios. Choice of Shift Speeds for manual transmissions determines various performance characteristics. Also, Downshift Speed, which is the vehicle speed at which a lower gear ratio is chosen for manual and automatic transmissions.

The following components and parameters are specified for some vehicle types, but not others:

Electric motors in different sizes (small, medium and large) and their respective weights, IC engines varied by their sizes (small, medium or large) and their corresponding weights, torque-speed characteristics and fuel-efficiency maps, Batteries, which include the number of cells in the pack with their respective weights, Speed reduction ratio, which refers to the gear ratio between the electric motor and the axle and, Control policy, which is applicable only to hybrid vehicles and is varied in terms of four parameters, the high and low values of vehicle velocities and high and low values of the state of charge at which the switch is made from primary reliance on one engine to primary reliance on another.

The designer supplies a set of plausible choices for each of these components and the Design Seeker explores them all. Candidates are generated by first selecting a vehicle configuration from the four choices, then systematically going through all relevant combinations of component choices and parameter-value choices. Constraints are applied at this stage, as described earlier. The design space size may be made to grow very large by stepping component changes through very small increments, e.g., small changes in cutoff speeds or gear ratios. Once interesting regions of space are explored during a first round of processing, finer distinctions may be made in selected areas of the space and additional explorations, similar to the first but at greater resolution, may be undertaken.

Design Critics. The following design critics were employed in the experiments: Maximum acceleration, top speed, city-driving efficiency, and highway-driving efficiency. Maximum acceleration was calculated as the time to reach 60 MPH. Experimental city-driving and highway-driving range critics were included, but were not used in dominance checking. Dynamical models of vehicle performance in the form of differential equations were constructed using well-understood vehicle-modeling methods. The equations were simulated temporally, (i.e., the values of the operating parameters were determined as a function of time using appropriately chosen time increments.) City and highway driving models imposed contours of desired velocities that were incorporated into the simulations. The models were simulated using Matlab and Simulink, widely available application packages, especially appropriate for simulating complex systems governed by differential equations. City and highway efficiency are correlated, and these are somewhat inversely correlated with both top speed and maximum acceleration.

Dominance Filtering. In Table 1, the results are presented for a large run, and smaller runs constructed from random sampling of the results of this run. The investigation of dominance filtering, therefore, is not skewed by recent improvements in the simulation models used by the critics. This experiment used the four critics mentioned in the previous section.

TABLE 1

Effectiveness of dominance filtering as the size of the space increases.

| Experiment | Designs Considered | Survivors | Percentage survivors |
|---|---|---|---|
| A | 1,798 | 71 | 3.949 |
| B | 17,711 | 173 | 0.977 |
| C | 179,874 | 556 | 0.309 |
| D | 1,796,025 | 1,078 | 0.060 |

Dominance filtering is quite effective in eliminating a large fraction of the design space. In this case, a small design space was cut by well more than an order of magnitude, and the largest was cut by more than three orders of magnitude. Dominance filtering is a practical way to help reduce the complexity of explicitly comparing very large numbers of design alternatives.

In order to investigate how the surviving fraction behaves with respect to the number of dimensions of comparative criticism, dominance filtering was run on a set of 17,711 candidates corresponding to Experiment B of Table 1 using subsets of two and three criteria each. Table 2 summarizes the results for two criteria each, while Table 3 does the same for three criteria. The entries in these tables represent the numbers of surviving designs. In Table 2, the rows and columns indicate the two criteria. (Because the situation is symmetric, only the top half of the table is filled.) In Table 3, the column heading indicates which one of the four criteria is not used.

TABLE 2

Effectiveness of dominance filtering for two criteria. Number of surviving designs is shown

|  | MPG (City) | Max Accel. | Top Speed |
|---|---|---|---|
| MPG (Highway) | 2 | 24 | 18 |
| MPG (City) |  | 36 | 18 |
| Max Accel. |  |  | 10 |

TABLE 3

Effectiveness of dominance filtering for three criteria. Number of surviving designs is shown.

| Not used: | MPG (Highway) | MPG (City) | Max Accel. | Top Speed |
|---|---|---|---|---|
|  | 103 | 83 | 35 | 76 |

The data in both tables, and the fact that 173 designs survived with four criteria, indicate that as the number of criteria increases, the tendency is for the effectiveness of dominance filtering to decrease. That is, a larger percentage of the candidates survive.

Scale of computation. In the largest experiment (Experiment D in Table 1), 2,152,698 designs were evaluated, of which 1,796,025 were fully specified. Fully specified designs were evaluated according to four performance criteria, which required multiple simulations of each design. Dominance filtering reduced the number to 1,078 best designs for human analysis. 207 workstations were used as clients during the experiment; from zero to 159 were running at any one time. The experiment used 164 hr. 41 min. of wall-clock time, 14 hr. 54 min. of CPU time on the server, for generation and evaluation, and approximately 4.5 hr. of wall-clock time for dominance filtering performed as serial post processing.

Figure 3:
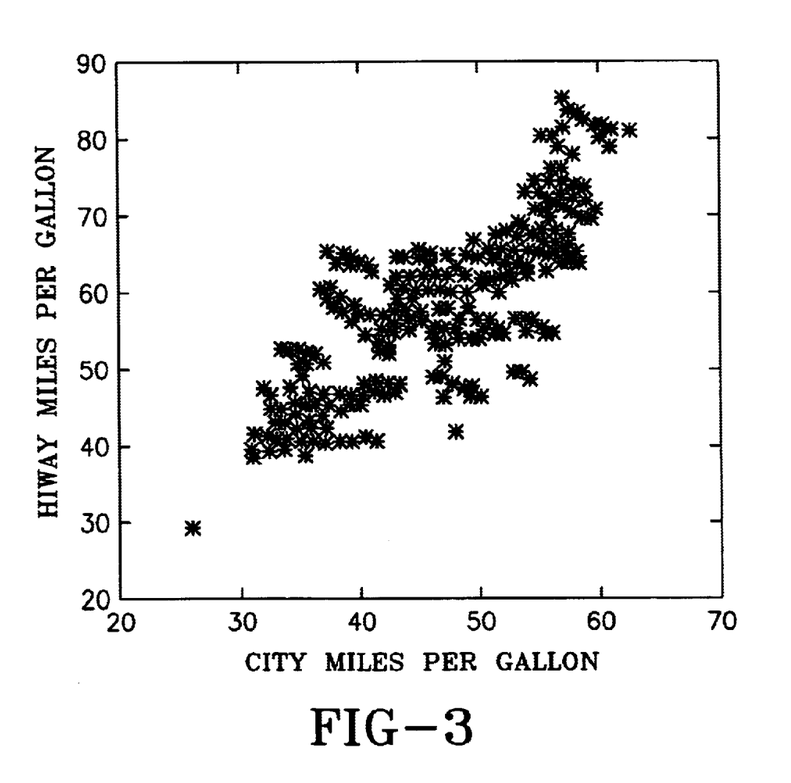
FIG. 3 is an example of a tradeoff diagram from an experiment performed using a preferred embodiment of the present invention.

Exploration Interface. FIG. 3 shows one of the six tradeoff diagrams from Experiment D obtained by considering the four criteria two at a time. In each diagram, each point that is plotted corresponds to a design that survived the strict dominance test. The designer can use the pointing device to select subsets for further examination, save and load such subsets and further narrow them.

The visualization interface assists the designer in debugging domain models and ensuring sufficient realism. In the experiment, the diagrams revealed designs with implausible performance characteristics; for example, at one stage of model development, some vehicles had unreasonably high top speeds. On one occasion, for several designs, the values of city driving efficiency were higher than those for highway driving efficiency, which is quite unreasonable. On another occasion, stratification of points in tradeoff diagrams indicated that time steps for the acceleration simulations had been set too coarsely. Visual exploration of this sort helps to ensure model accuracy. The tradeoff diagrams show the results of exercising the models over an extremely broad range of combinations of inputs. Model inaccuracies are given every opportunity to betray their presence through anomalies that appear in visualizations of the results.

Conclusion

Large-scale exploration as permitted by the present invention makes a significant contribution at the stage of conceptual design. The software architecture of the present invention provides for large-scale exploration. The architecture is comprised of: a Design Seeker that systematically generates and evaluates large numbers of candidate designs using multiple criteria, a Filter that passes only superior designs, and a Viewer that enables designers to investigate tradeoffs among the superior designs and select subsets for further analysis. The Design Seeker may use component substitution and exhaustive methods similar in spirit to drug discovery by "combinatorial chemistry." Filtering based on dominance is practical to implement and promises to reduce the number of alternatives to be considered from vast to manageable. The Viewer or visualization environment presents the designer with the-results of multi-criterial evaluation, without forcing the evaluation to a single criterion. Tradeoffs are displayed and the designer is able to bring evaluation and judgment to bear in choosing designs for further investigation.

What is claimed is:

1. A system for exploring a design space, comprising:
a first computer program that generates and produces a plurality of design candidates wherein each of said design candidates is generated and produced by selecting from a device library design components to be combined to compose said design candidates according to at least one design configuration template that identifies types of components from said device library to be selected for each of said design candidates;
a second computer program, in communication with said first computer program, that produces a subset of said plurality of design candidates using a filter that compares each design candidate to other design candidates and selects design candidates such that a design candidate that is inferior to any other design candidate is excluded from said subset of said plurality of design candidates;

and a third computer program, in communication with said second computer program, that presents in a scatterplot said subset of said plurality of design candidates selected by said filter, wherein each axis of said scatterplot represents a design criterion of said design candidates.

2. The system of claim 1 wherein said design candidates are generated and produced using generic device representations to enable generation and production of alternatives by component substitution.

3. The system of claim 1 wherein said first computer program generates and produces design candidates by generating at least one candidate configurations at least one candidate component for said configuration, and at least one candidate parameter value for said component.

4. The system of claim 1 wherein said first computer program evaluates each of said plurality of design candidates using at least one design critic.

5. The system of claim 1 wherein said first computer program evaluates said design candidates in parallel.

6. The system of claim 1 wherein said filter passes only Pareto optimal design candidates.

7. The system of claim 1 wherein said filter is based on toleranced dominance criteria.

8. The system of claim 1 wherein said third computer program links scatterplots such that design candidates selected within a first scatterplot are highlighted within at least one other scatterplot.

9. The system of claim 1 wherein said third computer program is adapted to zoom in on a selected subset of design candidates displayed in said at least one scatterplot.

10. The system of claim 1 wherein design candidates selected within said scatterplot are retained in an examination set.

11. The system of claim 10 wherein said third computer program is adapted to create unions, intersections, and subsets of examination sets.

12. The system of claim 10 wherein said third computer program is adapted to apply an abstraction agent to design candidates in said examination set, said abstraction agent adapted to automatically form at least one type of generalization about design candidates in said examination set.

13. The system of claim 10 wherein said third computer program is adapted to apply a clustering algorithm to design candidates in said examination set.

14. The system of claim 10 wherein said third computer program is adapted to apply a spatial analysis algorithm to design candidates in said examination set.

15. A system for exploring a plurality of design candidates comprising:

a first computer program that produces a subset of said plurality of design candidates using a filter that compares each design candidate to other design candidates and excludes design candidates based on plurality of dominance criteria wherein design candidates that are inferior to any of the other design candidates with respect to said plurality of dominance criteria are eliminated from said subset of said plurality of design candidates; and a second computer program, in communication with said second computer program, that presents in a scatterplot said subset of said plurality of design candidates produced by said filter, wherein each axis of said scatterplot represents a dominance criterion of said design candidates.

16. The system of claim 15 wherein said filter of said first computer program passes only Pareto optimal design candidates.

17. The system of claim 15 wherein said filter of said first computer program is based on a toleranced dominance criteria.

18. The system of claim 15 wherein said second computer program is adapted to link scatterplots such that design candidates selected within a first scatterplot are highlighted within at least one other scatterplot.

19. The system of claim 15 wherein said second computer program is adapted to zoom in on a selected subset of design candidates displayed in said at least one scatterplot.

20. The system of claim 15 wherein design candidates selected within said scatterplot are retained in an examination set.

21. The system of claim 20 wherein said second computer program is adapted to create unions, intersections, and subsets of examination sets.

22. The system of claim 20 wherein said second computer program is adapted to apply an abstraction agent to design candidates in said examination set, said abstraction agent adapted to automatically form at least one type of generalization about design candidates in said examination set.

23. The system of claim 20 wherein said second computer program is adapted to apply a clustering algorithm to design candidates in said examination set.

24. The system of claim 20 wherein said second computer program is adapted to apply a spatial analysis algorithm to design candidates in said examination set.

25. A system for exploring a design space, comprising:

a first computer program for generating and producing a plurality of design candidates wherein each of said design candidates is generated and produced by selecting from a device library design components to be combined to compose said design candidates according to at least one design configuration template that identifies types of components from said device library to be selected for each of said design candidates; and a second computer program, in communication with said first computer program, for presenting said plurality of design candidates in a plurality of scatterplots, wherein each axis of each of said scatterplots represents a design criterion of said design candidates and wherein said second computer program is adapted to link said scatterplots such that design candidates selected within a first scatterplot are highlighted within a second scatterplot.

26. The system of claim 25 wherein said first computer program generates and produces design candidates using generic device representations to enable generation of alternatives by component substitution.

27. The system of claim 25 wherein said first computer program generates and produces design candidates by generating at least one candidate configuration, at least one candidate component for said configuration, and at least one candidate parameter for said component.

28. The system of claim 25 further comprising at least one design critic for evaluating each of said plurality of design candidates.

29. The system of claim 28 wherein said first computer program evaluates said design candidates in parallel.

30. The system of claim 25 wherein said second computer program is adapted to zoom in on a selected subset of design candidates displayed in said at least one scatterplot.

31. The system of claim 25 wherein design candidates selected within said scatterplot are retained in an examination set.

32. The system of claim 31 wherein said second computer program is adapted to create unions, intersections, and subsets of examination sets.

33. The system of claim 31 wherein said second computer program is adapted to apply an abstraction agent to design candidates in said examination set, said abstraction agent adapted to automatically form at least one type of generalization about design candidates in said examination set.

34. The system of claim 31 wherein said second computer program is adapted to apply a clustering algorithm to design candidates in said examination set.

35. The system of claim 31 wherein said second computer program is adapted to apply a spatial analysis algorithm to design candidates in said examination set.

36. An apparatus to support multi-criterial decision making by a human user comprising:
- a first computer program for obtaining design alternatives, wherein each such design alternative represents a configuration of components selected from a device library of components to be combined to compose sad design alternatives according to at least one design configuration template that identifies types of components from said device library to be selected for each of said design alternatives and wherein each such design alternative has been evaluated according to a plurality of criteria;
- a second computer program, in communication with said first computer program, that reduces the number of design alternatives for further consideration using a filter that compares each design alternative to the other design alternatives and selects alternatives such that a design alternative that is inferior to any other design alternative is excluded from said subset of said plurality of design alternatives; and
- a third computer program, in communication with said second computer program, with which said human user is able to
  a) examine value tradeoffs among alternatives by considering a subset of design alternatives obtained by said first computer program or a subset of design alternatives obtained by said first computer and passed by said filter of said second computer program and
  b) narrow a decision by selecting a subset of design alternatives that reflect the values of said human user in making tradeoff decisions.

37. The apparatus of claim 36 wherein said first computer program generates design alternatives by component substitution and evaluates them using simulations.

38. The apparatus of claim 36 wherein the third computer program uses linked scatterplots to examine the value tradeoffs among said design alternatives.

* * * * *

UNITED STATES PATENT AND TRADEMARK OFFICE
CERTIFICATE OF CORRECTION

PATENT NO. : 6,771,293 B1
DATED : August 3, 2004
INVENTOR(S) : Josephson et al.

It is certified that error appears in the above-identified patent and that said Letters Patent is hereby corrected as shown below:

Title page,
Item [75], Inventors, please delete "John R. Josephson, Columbus, OH (US); Balakrishnan Chandrasekaran, Columbus, OH (US); Mark Carroll, Columbus, OH (US)" and insert -- John R. Josephson, Worthington, OH (US); Balakrishnan Chandrasekaran, Columbus, OH (US); Mark Carroll, Cambridge, England (UK) --.
Item [56], References Cited, OTHER PUBLICATONS, please add
-- Chandrasekaran, B., Diagrammatic Representation and Reasoning: Some Distinctions, AAAI Fall 97 Symposium Series.
Chandrasekaran, et al., Representing Function as Effect, Proceedings of the Fifth International Workshop on Advances in Functional Modeling of Complex Technical Systems, July, 1997.
Josephson et al., An Architecture for Exploring Large Design Spaces, American Association for Artificial Intelligence (www.aaai.org), 1998. --

Column 1,
Line 67, please delete "tinder" and insert -- under --.

Column 3,
Line 5, please delete "50." and insert -- 50 --.

Column 5,
Line 42, please delete "increase the" and insert -- increase f, the --.

Column 7,
Line 3, please delete "shape;" and insert -- shape. --.
Line 11, please delete "ExamnSet" and insert -- ExamSet --.
Line 28, please delete "Outliers" and insert -- outliers --.

Column 10,
Line 49, please delete "the-results" and insert -- the results --.

Column 11,
Line 17, please delete "configurations" and insert -- configuration, --.

UNITED STATES PATENT AND TRADEMARK OFFICE
CERTIFICATE OF CORRECTION

PATENT NO. : 6,771,293 B1
DATED : August 3, 2004
INVENTOR(S) : Josephson et al.

It is certified that error appears in the above-identified patent and that said Letters Patent is hereby corrected as shown below:

Column 12,
Line 5, please delete "a".

Column 13,
Line 20, please delete "sad" and insert -- said --.

Signed and Sealed this

Eighth Day of February, 2005

JON W. DUDAS
*Director of the United States Patent and Trademark Office*